Oct. 15, 1940.  W. F. GEMMILL  2,217,898
PORTABLE LIFTING APPARATUS
Filed Jan. 22, 1940  3 Sheets-Sheet 1
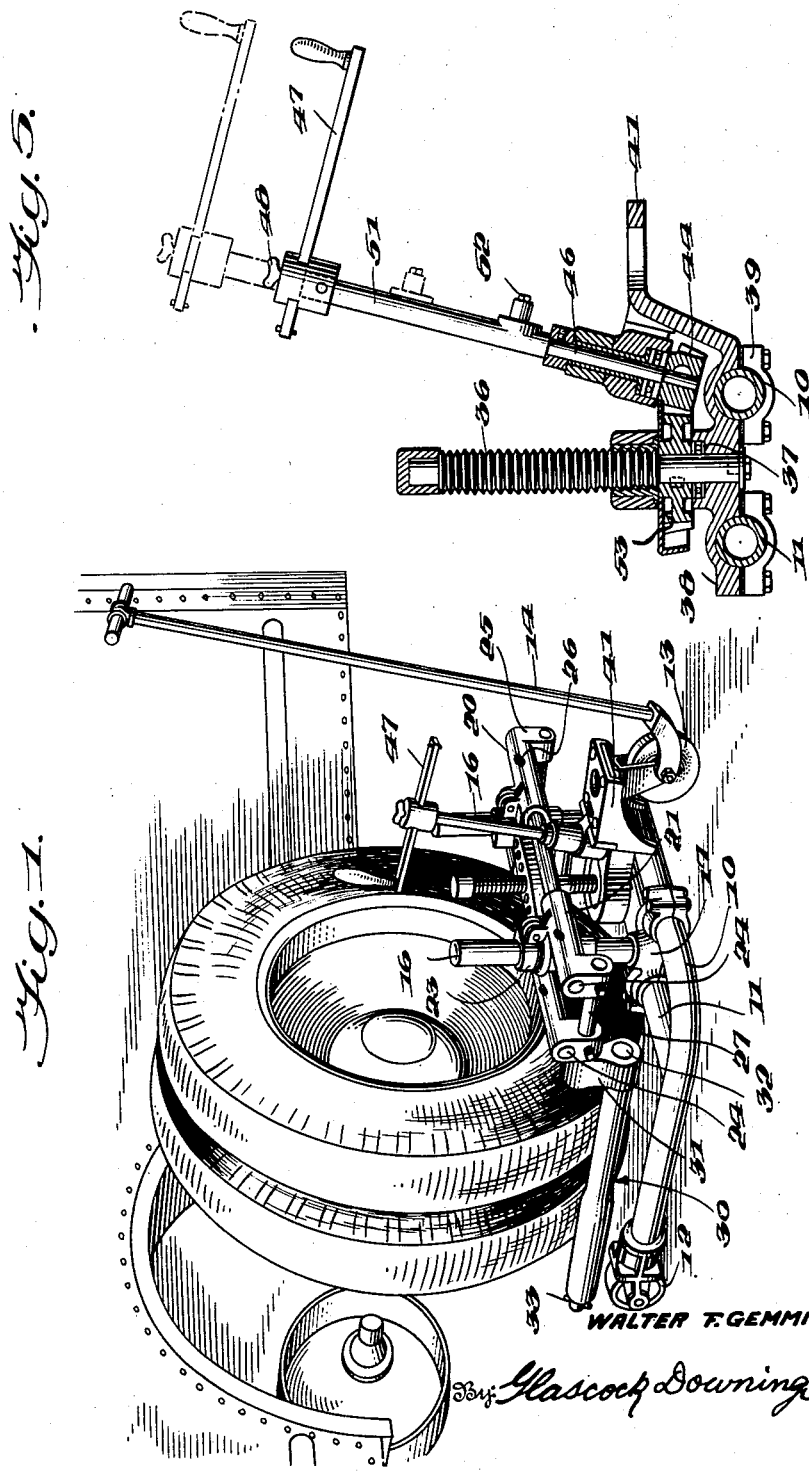

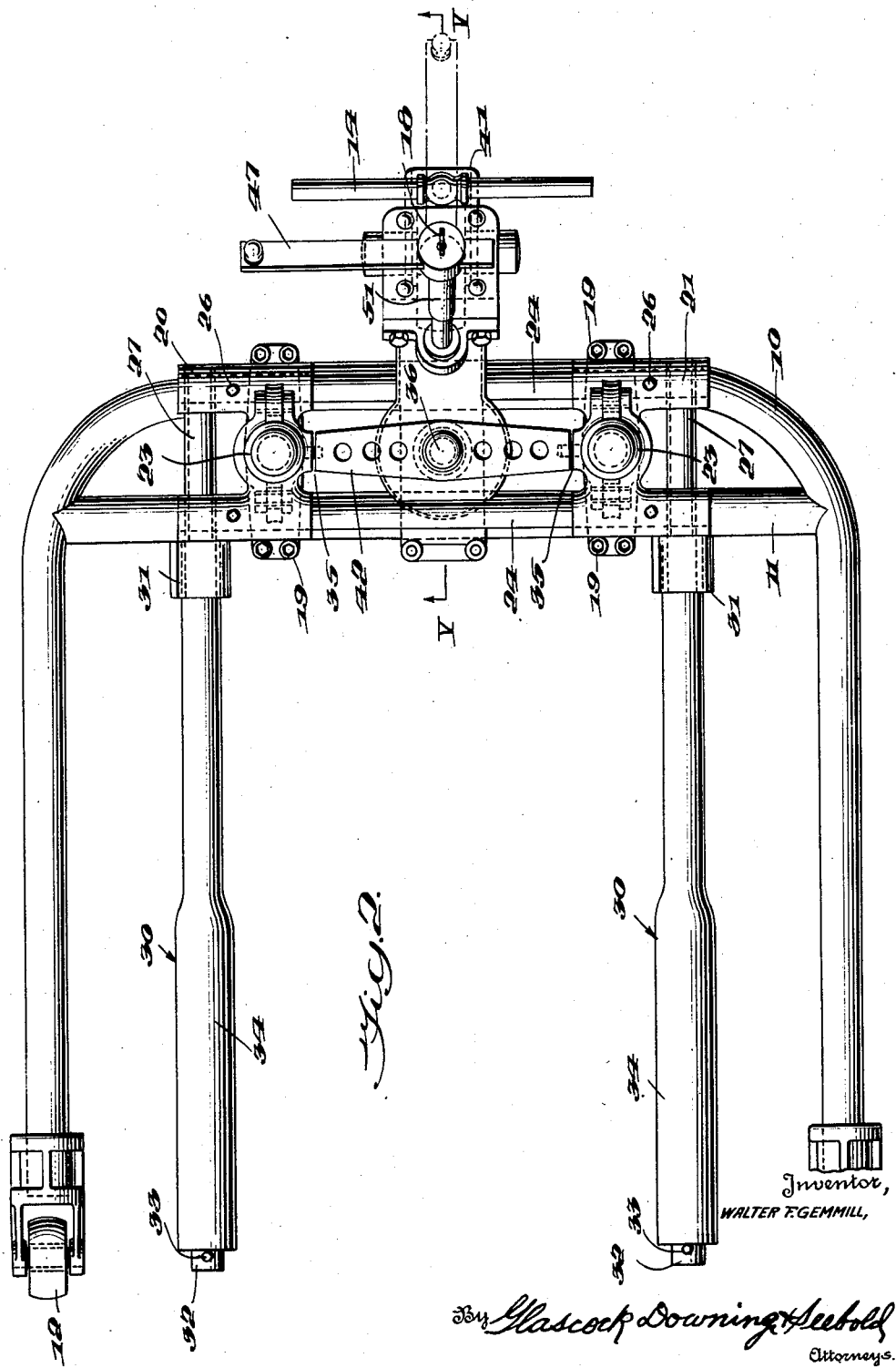

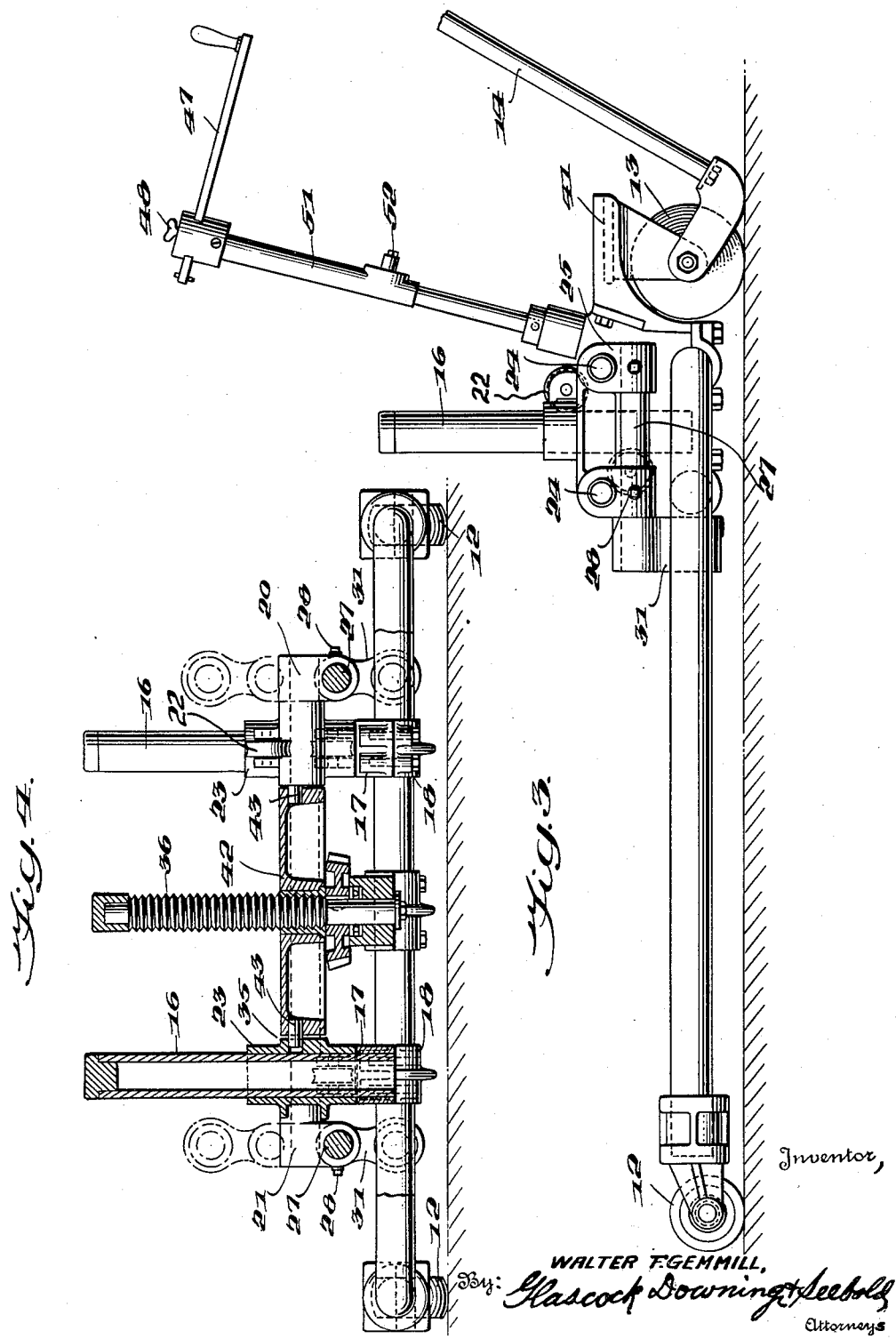

Patented Oct. 15, 1940

2,217,898

UNITED STATES PATENT OFFICE 2,217,898

PORTABLE LIFTING APPARATUS

Walter F. Gemmill, Hanover, Pa., assignor to The Peerless Equipment Company, Hanover, Pa.

Application January 22, 1940, Serial No. 315,064

8 Claims. (Cl. 254—2)

The present invention relates to portable lifting apparatus and more particularly pertains to such devices adapted for lifting and supporting vehicle wheels with the tires thereon so that the wheels and tires may be readily removed from the axle of motor vehicles. More specifically the invention relates to apparatus which may be referred to as a wheel dolly by means of which the tires and wheels of a truck or bus may be supported during the removal thereof from the vehicle axle and transported to a place for repair. The apparatus also provides convenient means for lifting the tires and wheels to a position for being secured on the axle of a motor vehicle.

The wheel arrangements of many of the heavier types of trucks and busses include two tires which are often arranged under close fitting fenders or in recesses of the body of the vehicle so that the vehicle body or fender partly embraces the wheel and tire structure and thus provides very little space for applying a lifting force to support the wheels and tires during removal and replacement thereof. The wheel and tire structure of such types of vehicles is in addition quite heavy and often incapable of being lifted by one or more individuals.

It is accordingly an object of the present invention to provide apparatus for supporting the weight of wheel and tire structures during the removal from and replacement on vehicles.

Apparatus of this general nature has been previously devised wherein clamping members are arranged to grip the periphery of the tires at diametrically opposite points and the weight of the wheel structure may thus be supported by the clamping members. Such apparatus however requires minute adjustment to bring the clamping members into engagement with the periphery of the tire and considerable rearrangement thereof is necessary for wheels and tires of different diameters. Further difficulties are encountered in the use of such apparatus when the tires are deflated since the clamping members cannot then be caused to properly grip the peripheral portions of the wheel assembly.

A more specific object of the present invention is to provide apparatus wherein wheels and tires of various diameters may be lifted and transported without the use of clamping members for gripping the periphery of the tires.

Another object of the invention resides in providing lifting apparatus for the wheel structure of vehicles wherein the lifting force is applied under the wheels by means of swingable arms which may be readily adjusted so as to be suitable for lifting and supporting wheel structures of various diameters.

A still further object of the invention resides in providing lifting apparatus wherein the weight of the tires and wheels may be readily supported even though the tires are not inflated.

Another object of the invention resides in providing lifting apparatus which may be readily manufactured wherein the parts are rugged and readily exchangeable including a lifting mechanism having a threaded spindle for moving the lifting arms upwardly without tendency of a nut threaded on the spindle from binding thereon.

Other and further features and objects of the invention will be more apparent from a consideration of the accompanying drawings and the following description wherein an exemplary embodiment of the invention is disclosed.

In the drawings:

Fig. 1 is a perspective view of the portable lifting apparatus embodying the invention illustrating the manner in which the wheels and tires of a vehicle may be supported for removal or replacement.

Fig. 2 is a plan view of the apparatus shown in Fig. 1.

Fig. 3 is a side elevational view of the lifting apparatus.

Fig. 4 is an end elevational view partly in section.

Fig. 5 is a sectional view of the lifting mechanism taken on the line V—V of Fig. 2.

Referring to the drawings there is shown in Figs. 1 and 2 a substantially U-shaped frame 10 which may be formed of tubular material and provided with a reinforcing member 11 traversing the closed end of the frame 10 and secured thereto in any suitable manner such as by welding the ends of the cross member 11 to the leg portions of the frame 10. The free ends of the U-shaped frame are provided with rollers 12 so as to maintain this portion of the frame at a predetermined distance above the ground or any supporting base such as the floor of a repair shop. The closed end portion of the U-shaped frame is supported by a caster 13 which may be turned in any desired direction by means of a handle 14. The caster 13 is of a conventional pivoting design and preferably supports the closed end of a U-shaped frame in a horizontal manner through means of a part of the lifting mechanism structure which is more specifically described hereinbelow. Thus the frame 10 and the mechanism carried thereby is portable and may be conveniently moved on the rollers 12 and the caster 13 and guided to any desired position by the handle 14.

The frame is provided with two vertically arranged guide posts 16 which extend upwardly from brackets 17 resting on the cross member 11 and the closed portion of the U-shaped frame 10 and securely attached to these portions of the frame by any well known means such as clamps 18 and bolts 19. The brackets 17 engage both the cross member 11 and the closed end portion of the frame 10 and are thus rigidly maintained in vertical positions. The guide posts are preferably tubular and closed at the upper ends by means of plugs as shown in Fig. 4.

Two lifting arm housings 20 and 21 are provided for guided movement on the posts 16. In other words each of the lifting arm housings 20 and 21 is provided with an integrally formed sleeve 23 arranged to slide on the guide posts 16 as shown particularly in Figs. 1 and 4. Rollers 22 are arranged in the sleeves 23 for engaging the guide posts 16 so as to facilitate free movement of the housings on the posts. Each lifting arm housing includes horizontally arranged portions having openings therein for receiving shafts 24. These shafts are secured in the horizontally bored portions of the lifting arm housings 20 and 21 by means of set screws 26. The shafts 24 preferably extend through both the lifting arm housings 20 and 21 as shown in Fig. 2.

The lifting arm housings 20 and 21 are provided with depending lugs 25 near the outer ends thereof for receiving shafts 27 which are rotatably arranged in bearings provided in the depending lugs. The shafts 27 thus extend substantially at right angles to the shafts 24 and may be maintained in any desired rotated position by suitable means such as set screws 28.

The lifting arms are carried by the shafts 27 through means of socket members 31 which are preferably shrunk on the ends of the shafts 27 and if necessary welded thereto. The socket members 31 thus carry the lifting arms indicated generally at 30 which include a central rod 32 tightly fitting in the socket members 31 and preferably welded therein. It is to be noted that each rod 32 is offset with respect to the axis of the shaft 27 and the socket and shaft 27 may be regarded as crank-shaped means. Each rod is provided with a sleeve 34 rotatably mounted thereon and retained in position on the rod 32 by means of a pin 33. This sleeve is thus retained in position on the rods 32 and each sleeve is preferably provided with a larger diameter near the open end of the U-shaped frame as illustrated in Figs. 1 and 2.

Any suitable type of lifting means may be provided for raising the lifting arm housings 20 and 21 so as to move these members upwardly on the guide posts 16 and thus elevate the lifting arms 30 with respect to the U-shaped frame. One type of lifting mechanism is illustrated in the drawings and includes a threaded spindle 36 which is arranged in a vertical manner and rotatably mounted to turn on a thrust bearing 37 as shown in Fig. 5. The thrust bearing is preferably arranged in a bracket 38 which engages the cross member 11 and the closed end portion of the U-shaped frame 10. The bracket may be secured to these members by means of clamps 39. The bracket 38 also carries an extension 41 to which the caster 13 is attached.

In order that the lifting arm housings 20 and 21 and the arms 30 may be moved by the threaded spindle 36 a transverse bar 42 is provided with a threaded opening engaging the threads of the spindle 36. The transverse bar 42 is arranged to extend to points adjacent the lifting arm housings 20 and 21 as illustrated in Figs. 2 and 4. The connection between the bar 42 and the lifting arm housings is accomplished by means of pins 43 so that each of the lifting arm housings may be moved on the guide posts 16 without the possibility of causing the threaded opening in the transverse bar 42 to bind on the threads of the spindle 36. The transverse bar 42 also terminates short of the lifting arm housings 20 and 21 so as to be spaced therefrom as indicated at 35 to permit relative longitudinal movement of the housings 20 and 21 with respect to the bar 42 and thus further prevent binding of the threaded spindle 36.

The necessary rotating motion is imparted to the spindle 36 by means of a gear wheel 44 which is keyed to the manually operable shaft 46 as shown in Fig. 5. The shaft 46 may be rotated by means of a hand crank 47 which may be adjusted to radially different positions by means of a screw 48. The hand crank 47 may also be raised and lowered on the shaft 46 by means of the telescoping tube 51 and maintained in any adjusted position thereon by the set screw 52. The gear wheel 44 meshes with a pinion 53 keyed to the spindle 36. Thus the lifting force may be applied to the lifting arm housings 20 and 21 by rotating the crank 47.

In operation of the portable lifting apparatus and when it is desired to remove a tire and wheel arrangement such as shown in Fig. 1 from the axle of a motor vehicle the apparatus may be moved on the rollers 12 and the caster 13 so as to direct the arms 30 under the lower portion of the wheel structure. The lifting arms 30 may be adjusted so as to properly engage under the tire of the particular wheel structure desired to be lifted by rotating the shafts 27 in the bearings of the depending lugs 25 provided on the lifting arm housings 20 and 21. The socket members 31 may therefore be turned to any positions intermediate of the extreme positions illustrated in broken lines in Fig. 4. The lifting arms 30 may then be secured in the adjusted positions by tightening the screws 28. The weight of the tire and wheel structure may be supported by rotating the crank 47 to move the bar 42 upwardly on the threaded spindle 36 and thus cause the lifting arm housings 20 and 21 to move upwardly on the guide posts 16. The lifting arm housings carrying the shafts 27 and the arms 30 will thus be moved upwardly with respect to the frame 10. The lifting arms will thus engage the under portions of the vehicle tires and support the weight of the wheel assembly. With the weight of the wheel and tire structure thus supported the bolts retaining the wheel or wheels on the vehicle axle may be removed and the wheel and tire structure thus supported may be transported to any desired position for repair of the tires by manipulation of the handle 14. The wheel assembly thus supported may be rotated on the arms 30 since the sleeves 34 are rotatable on the rods 32 so as to permit inspection of the tires. Thereafter any tire and wheel assembly may be supported by the arm 30 in a position for replacement on the axle of the vehicle. The rotatable sleeves 34 permit the wheel assembly thus supported to be turned so that the openings of the wheel or wheels may be aligned with the bolts for securing the wheels on the axle.

While the invention has been described with reference to specific structural details it will be appreciated that changes may be made therein by those skilled in the art. Such modifications may be made without departing from the spirit and scope of the invention as set forth in the appended claims.

I claim:

1. In portable lifting apparatus, a frame, spaced guide posts extending vertically from the frame, lifting arm housings movable on said guide posts, means for moving said housings with respect to said frame on said guide posts, a shaft rotatably supported by each housing, a socket member secured to each shaft, a lifting arm projecting from each socket member for engaging articles to be lifted, and means for securing each shaft in a given rotated position.

2. In portable lifting apparatus, a frame, spaced guide posts extending vertically from the frame, lifting arm housings movable on said guide posts, means for simultaneously moving said housings with respect to said frame on the guide posts, two spaced lifting arms, crank-shaped means secured to each lifting arm rotatably mounted on said housings, and means for locking said crank-shaped means in any rotated position.

3. In portable lifting apparatus for supporting wheel and tire structures, two spaced arms adapted to engage under the tire at circumferentially spaced points angularly separated a distance smaller than the diameter of the tire, crank-shaped means connected to each arm, spaced housings rotatably supporting said means, spaced guide posts for said housings, a frame supporting said guide posts, and means for moving the housings with respect to said frame on said guide posts.

4. In portable lifting apparatus for supporting wheel and tire assemblies, spaced arms separated from each other at a distance smaller than the diameter of the wheel and adapted to engage under the tire at circumferentially spaced points, crank-shaped means rigidly secured to each arm, spaced housings rotatably supporting said crank-shaped means whereby the spacing of said arms may be adjusted, spaced guide posts for said housings, a frame supporting said guide posts, means for moving the housings with respect to the frame and on said guide posts, and means for retaining said crank-shaped means in given rotated positions.

5. In portable lifting apparatus for supporting a wheel and tire assembly, a frame, spaced vertically arranged guide posts carried by the frame, a lifting arm housing movable on each guide post, a threaded rotatable spindle extending upwardly from the frame between the guide posts, a bar having a threaded opening engaging the threads of said spindle, and pins connecting the ends of said bar to said housings whereby the housings are moved with respect to the frame upon rotation of the spindle and the threaded opening of the bar is free to follow the threads of said spindle.

6. In portable lifting apparatus for supporting a wheel and tire assembly, a frame, spaced vertically arranged guide posts carried by the frame, a lifting arm housing movable on each guide post, a threaded rotatable spindle extending upwardly from the frame between the guide posts, a bar having a threaded opening engaging the threads of said spindle, the length of said bar being slightly less than the space between said housings, and pins connecting the ends of said bar to said housings whereby the housings are moved with respect to the frame upon rotation of the spindle and relative movement between the housings and the bar may take place.

7. In portable lifting apparatus for supporting a wheel and tire assembly, a U-shaped frame, a reinforcing member extending across the closed end portion of the frame, spaced vertical guide posts, means for clamping said guide posts to the reinforcing member and the closed end portion of the frame, a housing movable on each guide post, two shafts connecting the housings, lugs carried by the housings having openings therein at substantially right angles to said shafts, other shafts rotatably arranged in the openings of said lugs, a socket member carried by each of the last mentioned shafts, a lifting arm secured to each socket member offset with respect to the associated shaft, and screws threaded into each lug for retaining the last mentioned shafts in a particular rotated position 8. In portable lifting apparatus for supporting a wheel and tire assembly, a U-shaped frame, a reinforcing member extending across the closed end portion of the frame, spaced vertical guide posts, means for clamping said guide posts to the reinforcing member and the closed end portion of the frame, a housing movable on each guide post, two shafts connecting the housings, lugs carried by the housings having openings therein at substantially right angles to said shafts, other shafts rotatably arranged in the openings of said lugs, a socket member carried by each of the last mentioned shafts, a lifting arm secured to each socket member offset with respect to the associated shaft, screws threaded into each lug for retaining the last mentioned shafts in a particular rotated position, and a rotatable sleeve arranged on each lifting arm.

WALTER F. GEMMILL.